US008022804B2

(12) United States Patent
Pilniak et al.

(10) Patent No.: US 8,022,804 B2
(45) Date of Patent: Sep. 20, 2011

(54) WINDING ASSEMBLY

(75) Inventors: Jürgen Pilniak, Warstein-Allagen (DE); Peter Wallmeier, Lippstadt (DE)

(73) Assignee: DET International Holding Limited, Grand Cayman (KY)

(*) Notice: Subject to any disclaimer, the term of this patent is extended or adjusted under 35 U.S.C. 154(b) by 69 days.

(21) Appl. No.: 11/986,486

(22) Filed: Nov. 20, 2007

(65) Prior Publication Data

US 2008/0117012 A1 May 22, 2008

(30) Foreign Application Priority Data

Nov. 22, 2006 (EP) .................................... 06405488

(51) Int. Cl.

| | |
|---|---|
| ***H01F 27/28*** | (2006.01) |
| ***H01F 17/04*** | (2006.01) |
| ***H01F 7/06*** | (2006.01) |
| ***B29C 53/80*** | (2006.01) |
| ***B29C 70/86*** | (2006.01) |

(52) U.S. Cl. ........ 336/222; 336/182; 336/220; 336/221; 336/232; 156/169; 156/172; 29/605

(58) Field of Classification Search ........................ None
See application file for complete search history.

(56) References Cited

U.S. PATENT DOCUMENTS

| | | | | |
|---|---|---|---|---|
| 3,851,287 | A * | 11/1974 | Miller et al. | 336/84 R |
| 6,229,124 | B1 * | 5/2001 | Trucco | 219/605 |
| 6,529,389 | B2 * | 3/2003 | Perlick et al. | 363/20 |
| 6,759,936 | B2 * | 7/2004 | Yeh et al. | 336/90 |
| 6,859,130 | B2 * | 2/2005 | Nakashima et al. | 336/200 |
| 6,972,657 | B1 * | 12/2005 | Pacala et al. | 336/200 |
| 7,012,497 | B2 * | 3/2006 | Steingroever | 336/232 |
| 7,145,116 | B2 * | 12/2006 | Keishima et al. | 219/672 |
| 2002/0093413 | A1 | 7/2002 | Shin'ei | |
| 2002/0159214 | A1 | 10/2002 | Perlick et al. | |
| 2007/0057757 | A1 * | 3/2007 | Chen et al. | 336/212 |

FOREIGN PATENT DOCUMENTS

| | | | |
|---|---|---|---|
| DE | 40 22 243 | A1 | 1/1992 |
| EP | 1 598 838 | A2 | 11/2005 |
| JP | 58023171 | | 2/1983 |
| JP | 5-55048 | * | 3/1993 |
| WO | WO 2004/032158 | A1 | 4/2004 |
| WO | WO 2006/021100 | A1 | 3/2006 |

* cited by examiner

*Primary Examiner* — Anh T Mai
*Assistant Examiner* — Mangtin Lian
(74) *Attorney, Agent, or Firm* — Venable LLP; Robert S. Babayi; Christopher Ma

(57) ABSTRACT

A winding assembly for a transformer includes a wire winding and a sheet winding. The wire winding includes a spirally wound insulated wire and the sheet winding includes a metallic winding sheet that forms a single turn winding. Instead of winding the wire winding on a bobbin, sleeve or the like, the wire winding is attached directly to a surface of the winding sheet by means of a self-bonding technique.

10 Claims, 2 Drawing Sheets

WINDING ASSEMBLY

CROSS REFERENCE TO RELATED APPLICATIONS

This application claims priority from the European patent application No. 06 405 488.5 filed Nov. 22, 2006 in the name of DET International Holding Limited entitled "Winding Assembly," incorporated herein by reference.

FIELD OF THE INVENTION

The invention relates to a winding assembly for a transformer, the winding assembly having a wire winding and the wire winding including a spirally wound insulated wire. The invention further relates to a transformer with such a winding assembly and a method for forming such a winding assembly.

BACKGROUND

There are many transformer arrangements known in the prior art. Most of them include two or more coils where each coil includes one or more windings. Depending on the particular application, there are different kinds of windings such as for example wire windings, metal sheet windings, traces on a printed circuit board (PCB) and the like.

Most transformers which include a wire winding also include a bobbin, coil form or sleeve on which this wire winding is wound.

Document WO 2004/032158 (Delta Energy Systems) shows such a transformer. This transformer includes a coil form that is made of plastic and has a hole for insertion of a core. A first winding is formed by one or more separating plates that divide the outer surface of the coil form into two or more winding windows and a second winding is formed by a wire that is wound within one of the winding windows on the outer surface of the coil form. However, due to the coil form, the winding window utilization is low and there is a high thermal resistance between the core and the windings.

Document 2002/159214 A1 shows another transformer with a primary coil, a secondary coil and a magnetic core. The primary coil is a flat coil wound from a triple insulated wire and the secondary coil is formed by a trace on a PCB. While this transformer does not include a bobbin or the like but it includes a PCB which has to be produced in a separate step which makes it complicated and therefore expensive. Furthermore, this transformer is not suited for high power applications because neither the wire winding nor the PCB winding are suited for carrying a high current.

BRIEF DESCRIPTION

It is the object of the invention to create a winding assembly pertaining to the technical field initially mentioned, that overcomes the above problems and in particular enables fast, easy and therefore inexpensive manufacturing of a winding assembly with increased winding window utilization and a decreased thermal resistance between the coils and the core of a corresponding transformer.

The solution of the invention is provided in a winding assembly for a transformer (or other inductive elements) that includes a wire winding of spirally wound insulated wire which, in accordance with the invention, includes a sheet winding with a metal winding sheet and the wire winding attached directly to a first surface of the winding sheet.

By directly attaching the wire winding to the sheet winding, there is no need to provide the winding assembly with a bobbin or the like where the wire can be wound on. Accordingly, by avoiding a bobbin the winding window utilization can be increased tremendously. This means for example either that the size of the assembly can be decreased or that the number of turns of the wire winding and therewith the current capacity of the wire winding can be increased. Furthermore, the material requirements can be lowered and since there is no bobbin between the wire winding and the core of a transformer having such a winding assembly, the heat transfer between them can be increased, which means that the thermal resistance between them is reduced. The wire has to be insulated in order to avoid electrical contact between two adjacent turns of the wire winding, between the wire winding and the sheet winding as well as between the wire winding and a magnetic core that is a part of a transformer that includes such a winding assembly.

Furthermore, for producing a winding assembly according to the invention, there is no need to manufacture a separate bobbin or to assembly the coils with a bobbin. Accordingly, the number of manufacturing steps can be reduced which makes the production of such a winding assembly simpler, faster and therefore less expensive.

Attaching the spirally wound wire winding directly to the sheet winding further results in a stable construction. The stability can for example be influenced by the method used to attach the wire winding to the sheet winding, by the properties of the metal sheet (thickness, size, choice of material), by the properties of the wire used (diameter cross-sectional area, material), by the number of turns of the wire winding or by further parameters.

Generally, it would be possible to spirally wind the wire winding for example such that is includes several adjacent layers or that for example two successive turns are slightly displaced in order to achieve an even better winding window utilization. However, in this case not all turns have direct contact with the winding sheet. In a preferred embodiment of the invention, the spirally wound insulated wire forms a flat spiral that is directly attached to the winding sheet. Here, the term flat spiral denotes a spirally wound wire where all turns lie in the same plane. Preferably, the wire is wound such that each turn is directly adjacent to the previous and/or following turn of the wire winding. Accordingly, all turns of the wire winding are in direct contact with the winding sheet which further improves the heat transfer between the wire winding and the sheet winding. Furthermore, since each single turn is attached to the sheet winding, the stability of the winding assembly can be improved.

The wire winding can be attached to the sheet winding by every suitable technique such as for example clamps or other mechanical mechanisms. It is also possible to glue the wire winding to the sheet winding by means of an adhesive such as glue or paste. In this case, it would be advantageous to use an adhesive with a high thermal conductivity to improve the heat transfer between the windings.

In a preferred embodiment of the invention, the spirally wound insulated wire is attached to the metal winding sheet by a self-bonding technique. An advantageous example of such a self-bonding technique is to use a wire with a self-bonding layer on top of the insulation of the wire. This self-bonding layer (also designated as bonding lacquer or baking lacquer) includes for example a polymeric material that is meltable by applying heat. In such an embodiment of the invention, the wire winding is wound either directly on the desired surface of the sheet winding or wound separately and then positioned on the desired surface of the sheet winding and then the wire is heated. The self-bonding layer melts, liquefies and then—after the wire (and the metal sheet) have cooled down—the wire and the sheet winding are bonded together. Furthermore, two adjacent turns of the wire winding may be bonded together as well. The resulting connection is very stable.

In another preferred embodiment of the invention the wire has a circular cross section with a diameter between 0.2 mm and 1 mm. However, depending on a particular application, the diameter may also be larger or smaller. It is also possible to use wires with a cross section other than a circle such as for example wires with a rectangular cross section. Depending on the desired application, the wire can be a stranded (or litz) wire or it can be a solid wire.

In order to achieve the required insulation values, particularly in high power applications, the wire preferably includes a triple insulation as known in the art.

The winding sheet generally forms a single-turn winding and is therefore typically made of a metal that has a high thermal and/or electrical conductivity such as for example aluminum. Copper is also cheap and widely available and therefore preferably used as the base material for such winding sheets. The winding sheet can also be coated such as for example tin-plated or the like. The winding sheet is for example cut or blanked from a metal sheet. The thickness of the metal sheet is preferably between 0.1 mm and 1 mm, but again can be larger or smaller depending on the particular application. Such a winding sheet typically includes a ring-like shape having a slit for preventing circular currents and short circuits within the winding sheet. Typically, each end of this single-turn winding forms a terminal for interconnecting the sheet winding to other electrical circuits.

As described above, the winding assembly includes a first wire winding that is attached to a first surface of the winding sheet. In a preferred embodiment of the invention, the winding assembly includes a second wire winding that is produced and attached directly to a second surface of the winding sheet in the same or a similar manner as the first wire winding. Accordingly, the surface area of the sheet winding can be optimally utilized. Again, all turns of this second wire winding are in direct contact with the metal winding sheet resulting in a low thermal resistance between the wire winding and the sheet winding. One possibility to manufacture a winding assembly with a sheet winding and a wire winding on each side of the winding sheet is to produce both wire windings separately from two pieces of wire and then attach them to the winding sheet. Then the two wire windings can be connected to each other either in series or in parallel or they can be connected to other circuits as required by the respective application.

In a preferred embodiment, however, the wire windings are formed by a single piece of wire that is inserted or fed through an aperture of the winding sheet. Then a first portion of the insulated wire is directly wound on and attached to a first surface of the winding sheet and a second portion of the insulated wire is directly wound on and attached to a second surface of the winding sheet.

The wire winding(s) as well as the sheet winding are typically used as the coils of a transformer. Accordingly, each winding includes an aperture where a part of a core can be inserted such that a magnetic flux may be induced within the core by a current flowing in one of the windings or such that a voltage/current is induced within a winding by a magnetic flux flowing within that core segment. The spirally wound insulated wire is therefore preferably attached to the metal winding sheet such that an aperture of wire winding and an aperture of said sheet winding form a common aperture for insertion of the magnetic core.

In order to avoid the winding sheet touching the magnetic core, the aperture of the wire winding is typically smaller than the aperture of the winding sheet. That is, the size of the aperture of a wire winding matches the shape of the magnetic core, such that the core can be inserted through this aperture. And since the aperture of the winding sheet is slightly larger than that of the wire winding to which it is attached, the winding sheet is prevented from touching the magnetic core.

In general the apertures of the sheet winding can be of any desired shape that matches the shape of the core to be inserted. In a preferred embodiment, this aperture is substantially circular which for example simplifies the manufacturing. As already described above, the wire winding is formed by a spirally wound insulated wire. The aperture of such a wire winding is then defined by the most inner turn of said wire winding. This most inner turn can for example be wound as a circle. But it can also have the shape of a polygon. Such a polygon shape of the most inner turn is preferred, because the size of this turn that defines the aperture of the wire winding can be chosen such that a circumscribed circle of this polygon has a larger diameter than the diameter of the circular aperture of the winding sheet and such that an inscribed circle of this polygon has a smaller diameter than the diameter of the circular aperture of the winding sheet.

Accordingly, the part of the magnetic core that is inserted into the winding assembly has a circular cross-section as well. In order that the core is insertable into this aperture, the diameter of the core is slightly smaller than the diameter of the above mentioned inscribed circle. In this way it is prevented that the core that is inserted into this polygon aperture can get in touch with the winding sheet.

In accordance with an exemplary specific embodiment, a transformer includes a core such as for example a magnetic core and at least one winding assembly as described above. The winding sheet and the wire windings of each winding assembly form a common aperture as previously explained. In such a transformer, a part of the core is inserted into the common aperture of each of these winding assemblies.

Such a transformer is well suited for applications with a low current in the primary and a high current in the secondary of the transformer. Accordingly, the wire windings preferably form a primary coil or a part of a primary coil of the transformer and the sheet windings form a secondary coil or a part of a secondary coil of the transformer. In other applications the wire windings can also form a secondary coil and the sheet winding can also form a primary coil.

The method for forming the winding assembly according to the invention includes the step of forming a wire winding by spirally winding an insulated wire. According to one aspect of the invention this method further includes the steps of:

forming a sheet winding by providing a metal winding sheet, and attaching said wire winding directly to a surface of said winding sheet.

Compared to the prior art, the number of manufacturing steps can be reduced. There is for example no need to manufacture a bobbin or to assemble the coils with a bobbin. The manufacturing can therefore be simplified and expedited.

A winding assembly according to the invention can for example be manufactured by producing both winding types, that is the wire winding and the sheet winding, independent from each other and then putting them together to form the winding assembly. In a faster, more efficient and therefore preferred way of manufacturing such a winding assembly, the wire winding is not wound separately and independently of the sheet winding, but the insulated wire is directly wound on the surface of the winding sheet. Hence, the step of putting the wire winding and the sheet winding together can be saved.

In order to form the stable winding assembly, the windings then simply have to be joined with each other, for example by a self-bonding technique as previously described, where the winding sheet is attached to the sheet winding by melting a bonding layer of the wire winding on the surface of the winding sheet.

Thereby, the bonding lacquer has to be heated such that it melts and the wire is bonded to the winding sheet. The wire can be heated in different ways. It can for example be heated by baking the winding sheet together with the assembled wire winding in a stove of the like, by focusing an unshielded flame of a burner or the like directly onto the wire and the sheet winding or by guiding a current through the wire. However, these methods waste a lot of energy. In order to bond the wire to the winding sheet, only those parts of the wire surface that are in contact with the sheet winding, have to be heated. But with these aforementioned methods, more than only those parts are heated. In a preferred manufacturing method the wire winding is melted on the surface of the winding sheet by heating just the winding sheet. An efficient way for heating the winding sheet is for example to guide a current through the winding sheet. Additionally, the previously mentioned further heating methods can also be applied, if needed or desired.

As described above, in a preferred embodiment the winding assembly includes two wire windings where the first wire winding is attached to the first surface of the winding sheet and a second wire winding is attached to the second surface of the winding sheet.

Such an assembly can for example be manufactured by winding two wire windings separately from each other by using two single pieces of wire and then attaching these wire windings to the respective surfaces of the sheet winding.

However, such an assembly is preferably manufactured by inserting the wire through an aperture of the winding sheet, winding a first portion of the insulated wire directly on the first surface of the winding sheet and winding a second portion of the insulated wire directly on the second surface of the winding sheet. It is even more preferred to wind the first and the second portion to the respective surfaces simultaneously and also to attach them to the respective surfaces simultaneously. Here, both wire windings are wound starting with the most inner turn and then spirally winding the wire outwards.

Furthermore, since the two wire windings are formed from a single piece of wire, it is not necessary to connect them in a separate step. This method therefore saves time and enables one to lower the costs for producing the winding assemblies.

In a winding assembly with two wire windings, these wire windings can either be connected in parallel or in series, whatever is better suited to fulfill the requirements of a particular application. For example in order to enlarge the number of turns of the wire coil of a corresponding transformer, the two wire windings are connected in series. In this case, the ends of the single piece of wire are not connected to each other. If, however, the current capacity of the wire winding is to be increased, the two wire windings are connected in parallel by connecting the ends of the wire.

Finally a transformer can be built by inserting a magnetic core into the common aperture of one, two or more winding assemblies and interconnecting the wire windings as well as the sheet windings as required to provide the desired transformer arrangement. In this way numerous variations of transformers can be provided.

Other advantageous embodiments and combinations of features come out from the detailed description below and the totality of the claims.

BRIEF DESCRIPTION OF THE DRAWINGS

The drawings used to explain the embodiments show.

DETAILED DESCRIPTION

Figure 1:
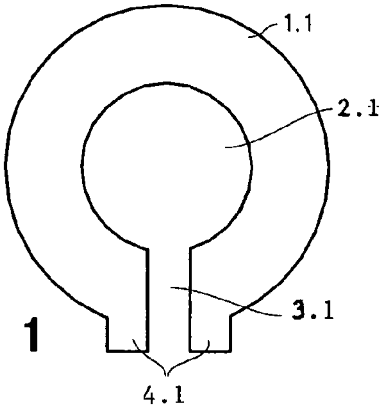
FIG. 1 is a plan view of a first embodiment of a winding sheet for use in a winding assembly according to the invention.

FIG. 1 shows a first embodiment of a winding sheet 1.1 for use in a winding assembly according to the invention. The winding sheet 1.1 forms a single turn winding and has generally a circular shape and includes an aperture 2.1 in the center of the winding sheet 1.1 for insertion of a magnetic core (not shown). It further includes a slit 3.1 for inhibiting circular currents in the winding sheet 1.1 around the aperture 2.1. Two terminals 4.1 are formed on either side of the slit 3.1 for electrically connecting the winding sheet 1.1 to an electrical circuit such as for example an output circuit of a power supply.

The winding sheet 1.1 has a length and a width in the range of some centimeters and is for example cut from a copper sheet having a thickness of about 0.5 mm.

Figure 2:
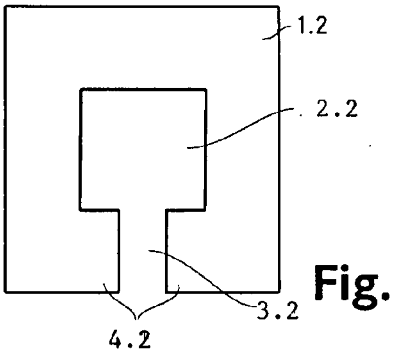
FIG. 2 is a plan view of a second embodiment of a winding sheet for a winding assembly according to the invention.

FIG. 2 shows a second embodiment of a winding sheet 1.2 for a winding assembly according to the invention. In this embodiment, the winding sheet 1.2 has generally a rectangular, particularly a square shape with an aperture 2.2 and a slit 3.2. No pads are provided as terminals but the terminals 4.2 are formed as an integral part of the winding sheet 1.2.

Figure 3:
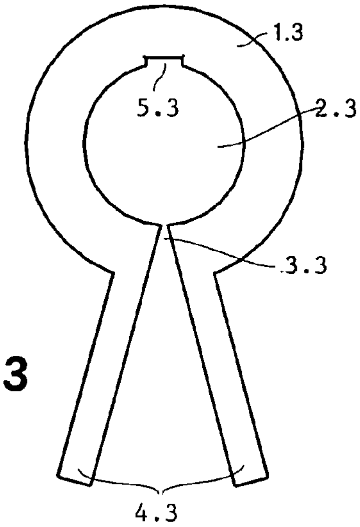
FIG. 3 is a plan view of a third embodiment of a winding sheet for a winding assembly according to the invention.

A third embodiment of a winding sheet 1.3 is shown in FIG. 3. This winding sheet 1.3 is very similar to the winding sheet 1.1 shown in FIG. 1. Here, the terminals 4.3 are longer and the winding sheet 1.3 includes a recess 5.3 on its inner boundary that defines the aperture 2.3. This recess 5.3 is used to feed the wire that forms the wire winding from the front surface of the winding sheet 1.3 (shown) to its rear surface (not visible in FIG. 3) if there is a core inserted into the aperture 2.3.

Figure 4:
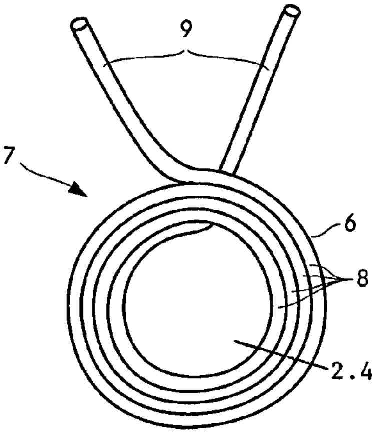
FIG. 4 is a plan view of a wire winding for a winding assembly according to the invention.

FIG. 4 shows a wire 6 that is spirally wound to form a wire winding 7 that has four turns 8 and an aperture 2.4, where each turn 8 is close to the previous and/or the following turn 8. That is, each turn 8 is in direct contact with the adjacent turn(s) 8. The ends 9 of the wire 6 stick out so as to enable to connect them together and/or to another electrical circuit such as for example an input circuit of a power supply.

Figure 5:
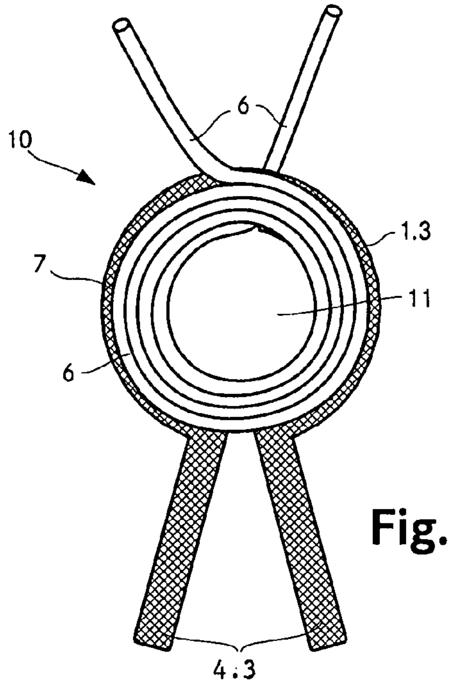
FIG. 5 is a plan view of a winding assembly according to the invention with a winding sheet as shown in FIG. 3 and a wire winding as shown in FIG. 4.

FIG. 5 shows a winding assembly 10 according to the invention. The winding assembly 10 includes a winding sheet 1.3 such as the winding sheet 1.3 shown in FIG. 3. It further includes a wire winding 7 such as the wire winding shown in FIG. 4. The winding sheet 1.3 and the wire winding 7 are attached to each other such that their apertures 2.3 and 2.4 form a common aperture 11 of the winding assembly.

This winding assembly 10 can for example be used to build a transformer by inserting a magnetic core through the common aperture 11. The wire winding 7 may form a primary winding of the transformer and the winding sheet 1.3 may form a secondary winding of the transformer. In this example, the wire winding 7 is bonded to the winding sheet 1.3 by means of a wire 6 with a so-called bonding or baking lacquer.

Figure 6:
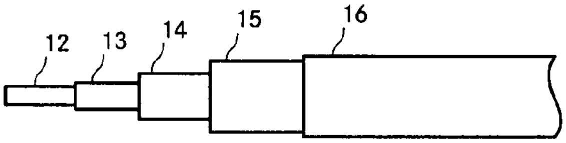
FIG. 6 is a fragmentary view showing a configuration of a wire for winding a wire winding.

An exemplary configuration of such a wire is shown in FIG. 6. The wire 6 shown is a triple insulated wire that is well suited for high power applications. The core of the wire is formed by the conductor 12. Then follow three insulation layers 13, 14 and 15. The outermost layer of the wire 6 is formed by a self-bonding layer 16 which covers the outer surface of the wire 6. In other words, the wire 6 is coated with the self-bonding layer 16 of a polymer material which melts at a given temperature. This melting temperature depends on the particular material used as the self-bonding layer 16.

For producing a winding assembly according to the invention, such a wire 6 is spirally wound to form a wire winding 7 as shown. If not wound directly onto the winding sheet 1.3 as discussed above, then this wire winding is positioned on the surface of the winding sheet 1.3 as shown in FIG. 5. By guiding a current of suitable amperage through the winding sheet 1.3, the winding sheet 1.3 heats up. Thereby the wire 6 that is in contact with the surface of the winding sheet 1.3 is heated too. When the melting temperature of the self-bonding layer 16 is reached, this layer begins to melt and the wire 6 is bonded to the surface of the winding sheet 1.3. After cool down, the self-bonding layer forms a strong connection between the wire winding 7 and the winding sheet 1.3 and the resulting winding assembly 10 has a high physical stability.

Figure 7:
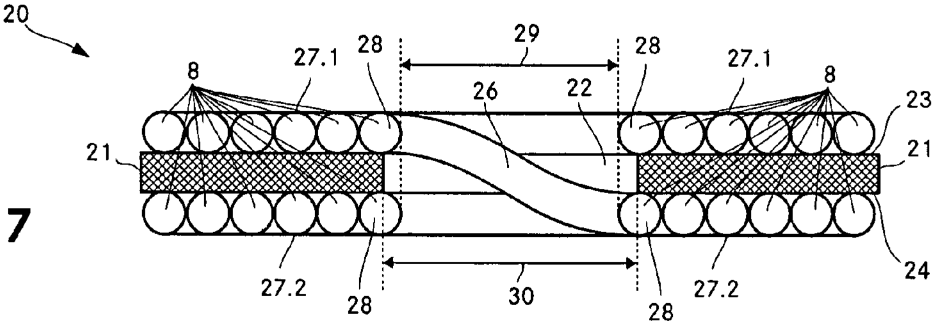
FIG. 7 is a cross-sectional view of a winding assembly according to the invention.

FIG. 7 shows a sectional drawing through a further winding assembly 20 which includes a winding sheet 21 with an aperture 22 and two wire windings 27.1 and 27.2. One wire winding 27.1 is bonded to the upper surface 23 and the other wire winding 27.2 is bonded to the lower surface 24 of the winding sheet 21. Both wire windings 27.1 and 27.2 include a number of turns 28 and are wound from a single piece of wire 26 which connects both wire windings 27.1 and 27.2 through the aperture 22.

The winding assembly 20 is for example produced as follows: The wire 26 is fed through the aperture 22 of the winding sheet 21. Then, both wire windings 27.1 and 27.2 are wound simultaneously on the respective surfaces of the winding sheet 2.1. Typically, both wire windings 27.1 and 27.2 are wound in the same direction such that the magnetic flux that is induced in the magnetic core of each wire winding 27.1 and 27.2 is added to each other and flows in the same direction.

Then a current is guided through the winding sheet 21 which heats up the winding sheet 21. At the same time, the wire windings 27.1 and 27.2 are heated as well, the self-bonding layer melts and both wire windings 27.1 and 27.2 are bonded to the winding sheet 21.

To simplify matters, it is assumed that the wire windings 27.1 and 27.2 have a circular shape as well as the aperture 22 of the winding sheet 21 and the cross-section of the core inserted into the aperture 22. In this case, it is to note that the diameter 29 of the most inner turn 28 of both wire windings 27.1 and 27.2 is smaller than the diameter 30 of the aperture 22 of the winding assemblies 20. Therefore, a core that is insertable into the aperture 22 has to have a smaller diameter than the diameter 29 which means that the core cannot touch the winding sheet 21.

However, for one skilled in the art, it is clear that the wire windings 27.1 and 27.2, the aperture 22 and the cross-section of the core can also have a non-circular shape. As long as they have a similar shape, and as long as the dimensions of the most inner turn is smaller than the corresponding dimensions of the aperture, the core can be prevented from touching the winding sheet 21 (see also FIG. 9).

Figure 8:
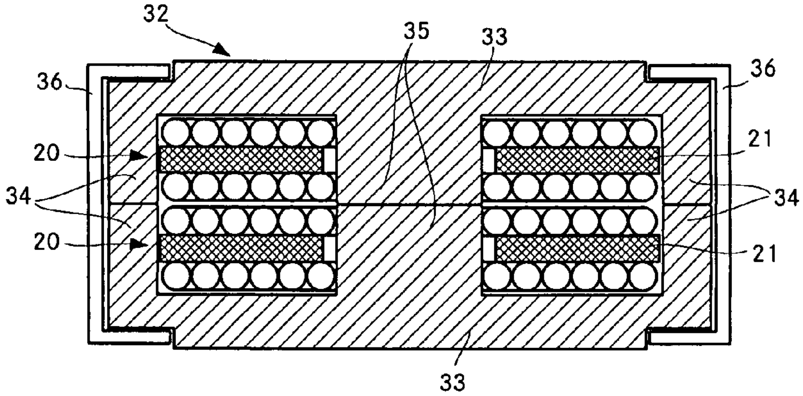
FIG. 8 is a cross-sectional view of a transformer according to the invention.

A transformer 31 according to the invention is shown in FIG. 8. The transformer 31 includes two winding assemblies 20 as shown in FIG. 7 that are stacked one upon the other. The transformer 31 further includes a magnetic core 32 that is made up of two E-type core halves 33. The core 32 has for example two outer legs 34 and a middle leg 35 that is inserted into the apertures 22 of both winding assemblies 20. The two core halves 33 of the transformer 31 are held together by two clamps 36.

Figure 9:
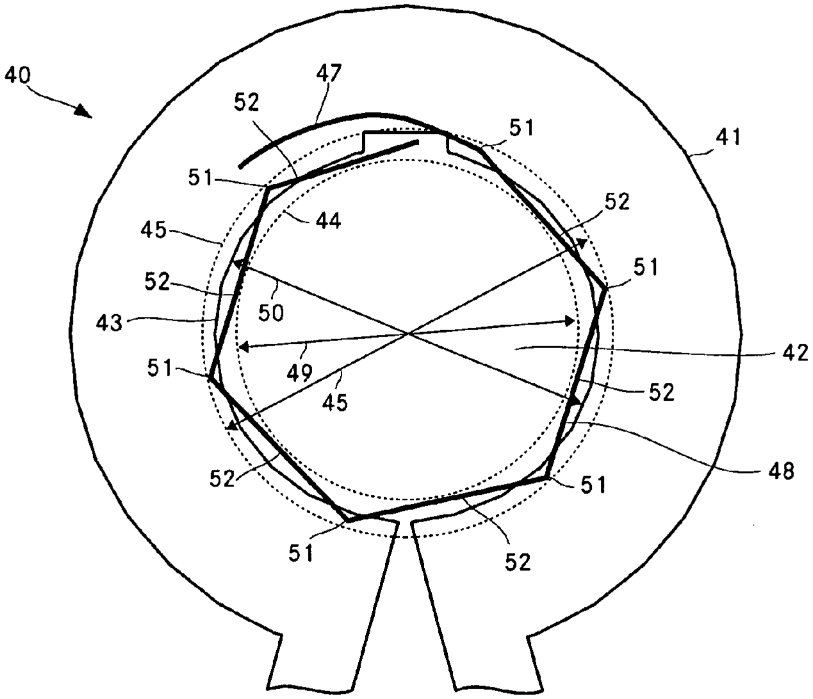
FIG. 9 is a schematic illustration of a winding assembly where the most inner turn of the wire winding has a polygonal shape.

FIG. 9 shows a schematic illustration of a further winding assembly 40 in a top view. The winding assembly 40 includes a winding sheet 41 that corresponds to the winding sheet 1.3 as shown in FIG. 3. The aperture 42 of this winding sheet is defined by a circular edge 43 of the winding sheet 41. The winding assembly further includes a wire winding 47, where only the most inner turn 48 and a small part of the next outer turn is shown. In this case, the most inner turn 48 has a polygonal shape, particularly the shape of a regular hexagon with corners 51 and sides 52.

The size of the hexagon is chosen such that the diameter 49 of the inscribed circle 44 of this hexagon is smaller than the diameter 50 of the circular edge 43. And it is chosen such that the diameter 45 of the circumscribed circle 46 of this hexagon is larger than the diameter 50.

Due to this size of the hexagon, all six corners of the hexagon, that is the corners 51 of the most inner turn 48, are resting on the surface of the winding sheet 41, whereas a middle section of each side 52 of the hexagon does not rest on the surface of the winding sheet 41. In other words, with the exception of these middle sections of the sides 52, the whole wire winding 47 is in direct contact with the surface of the winding sheet 41 which improves the heat transfer between the wire winding 47 and the winding sheet 41 as well as improves the overall stability of the winding assembly 40, because all parts of the wire winding 47 that are in direct contact with the winding sheet 41 are bonded to the winding sheet 41.

Accordingly, the maximum diameter of a core leg (with a circular cross-section) that is to be inserted into the aperture 42 of the winding assembly 40 is the diameter 49 of the inscribed circle 44. Typically the diameter of the corresponding core leg is chosen such that it is slightly smaller than the diameter 49 of the inscribed circle 44.

This ensures that the inserted core leg cannot touch the winding sheet 41 because the aperture 42 of the winding sheet 41 is larger than the maximum possible cross-section of the core. Furthermore, the sides 52 of the most inner turn 48 have the effect that the inserted core is centered in aperture 42.

Even though the innermost turns of the winding of FIG. 9 is hexagonal, the winding is, nevertheless, referred to as spirally wound. "Spirally would," and "spiral" as used herein, then, mean substantially coplanar winding turns laid substantially adjacent each other surrounding a central aperture, but which may be generally circular, oval or polygonal in shape.

In summary it is to be noted that the invention enables the manufacturing of a winding assembly without the need to provide a bobbin or the like. The resulting winding assembly is relatively small in size and shows high winding window utilization. It has a simple buildup and can therefore be manufactured in an uncomplicated, easy and inexpensive way. The same applies to a transformer with such a winding assembly.

Whereas preferred exemplary embodiments of windings, winding assemblies and transformers according to the invention have been illustrated and described, it will be appreciated by one skilled in the art that various modifications and additions or changes may be made to fashion other embodiments without departure from the invention as set forth in the appended claims.

We claim:

1. A winding assembly for a transformer or other inductive element, having: a wire winding comprising a spirally wound insulated wire; and a metal winding sheet, wherein said wire winding is bound directly to a first surface of the metal winding sheet and wherein the spirally wound insulated wire is bound to the metal winding sheet such that an aperture of said spirally wound insulated wire and an aperture of said metal winding sheet form a common aperture for insertion of a magnetic core, the aperture of the metal winding sheet is a substantially circular aperture, the aperture of the spirally wound insulated wire is defined by an innermost turn of said wire winding and the innermost turn of the wire winding substantially has a shape of a polygon, a circumscribed circle of the polygon having a larger diameter than a diameter of the substantially circular aperture, and an inscribed circle of the polygon having a smaller diameter than the diameter of the substantially circular aperture.

2. The winding assembly according to claim 1, wherein said spirally wound insulated wire forms a flat spiral, such that all turns of the spiral are in direct contact with the metal winding sheet.

3. The winding assembly according to claim 1, wherein the spirally wound insulated wire is bound to the metal winding sheet by a self-bonding technique.

4. The winding assembly according to claim 1, wherein said spirally wound insulated wire has a circular cross section with a diameter between 0.2 mm and 1 mm, and said metal winding sheet is made of copper and has a thickness between 0.1 mm and 1 mm.

5. The winding assembly according to claim 1, wherein the winding assembly includes a further wire winding with a spirally wound insulated wire, wherein said further wire winding is bound directly to a second surface of the metal winding sheet.

6. The winding assembly according to claim 2, wherein the winding assembly includes a further wire winding with a spirally wound insulated wire, wherein said further wire winding is bound directly to a second surface of the metal winding sheet.

7. The winding assembly according to either claim 1 or 2, wherein the wire winding is formed by a single piece of wire.

8. A transformer with a core and at least one winding assembly as claimed in any one of claims 1, 2 or 5, a part of said core being inserted into a common aperture of the spirally wound insulated wire and the metal winding sheet of each of said at least one winding assembly.

9. The transformer according to claim 8, wherein the wire winding of said at least one winding assembly forms a part of a primary coil of the transformer and wherein the metal winding sheet of said at least one winding assembly forms a part of a secondary coil of the transformer.

10. The transformer according to claim 1, wherein the common aperture is formed by an aperture of the spirally wound insulated wire in an alignment with an aperture of the metal winding sheet, the periphery of the aperture of the spirally wound insulated wire extending at least in part inward of the periphery of the aperture of the metal winding sheet to prevent said part of the core contacting with the metal winding sheet.

* * * * *